United States Patent [19]
Boughton et al.

[11] 3,969,603
[45] July 13, 1976

[54] PLASMA-MIG ARC WELDING

[75] Inventors: Peter Boughton, Balsham; David Bernard Swann Clarke, Horston, both of England

[73] Assignee: U.S. Philips Corporation, New York, N.Y.

[22] Filed: Oct. 7, 1974

[21] Appl. No.: 512,187

Related U.S. Application Data

[63] Continuation of Ser. No. 377,899, July 10, 1973, abandoned.

[30] Foreign Application Priority Data

July 12, 1972 United Kingdom............... 32572/72

[52] U.S. Cl. .............................. 219/121 P; 219/74
[51] Int. Cl.² ........................................... D23K 5/00
[58] Field of Search ............ 219/121 P, 74, 75, 136, 219/137; 313/231.3

[56] References Cited
UNITED STATES PATENTS

| | | | |
|---|---|---|---|
| 2,862,099 | 11/1958 | Gage...................................... | 219/74 |
| 3,312,566 | 4/1967 | Winzeler et al. ............ | 219/121 P X |
| 3,612,807 | 10/1971 | Liefkens et al.................. | 219/121 P |
| 3,818,175 | 6/1974 | Essens et al...................... | 219/121 P |

*Primary Examiner*—J. V. Truhe
*Assistant Examiner*—G. R. Peterson
*Attorney, Agent, or Firm*—Frank R. Trifari; J. David Dainow

[57] ABSTRACT

A plasma-MIG welding method and device in which a stream of oxidizing gas, such as argon plus 2% oxygen, is introduced into the plasma arc in the region of the plasma nozzle orifice. This improves the stability of the MIG arc, and higher welding currents can be used, especially with negative polarity on the electrodes and the plasma and MIG arcs.

9 Claims, 2 Drawing Figures

PLASMA-MIG ARC WELDING

This is a continuation of application Ser. No. 377,899, filed July 10, 1973, now abandoned.

BACKGROUND OF THE INVENTION

This invention relates to a method of and apparatus for plasma-MIG arc welding. In plasma-MIG (Metal-Inert-Gas) arc welding, a plasma arc is maintained in a gas flow between a non-consumable electrode and a workpiece, a consumable electrode is guided into the plasma steam coaxially therewith, and a MIG arc is maintained between the consumable electrode and the workpiece.

The terminal, or end, portion of the consumable electrode and the MIG-arc are both surrounded by a plasma sheath, which is produced by the plasma arc. Basically the effect of the plasma arc is to provide additional heating of the workpiece compared with the MIG-arc alone, resulting in a very wide range of different weld types and in extremely high deposition rates. In detail there are interactions between the plasma and MIG-arc systems which determine the field of use. The plasma arc and the MIG-arc have to have the same polarity, positive or negative, but need not be identical in voltage.

With both the electrodes positive a stable operating system is obtained, the position of the arc root on the consumable electrode being clearly defined within narrow limits. The MIG-arc takes whatever current is necessary to burn off the consumable electrode at the rate at which it is fed into the plasma stream. Therefore increasing the electrode feed rate in turn demands a greater current from the MIG power supply. The latter has a relatively flat output characteristic, such that the necessary current can be obtained without a major change in terminal voltage. It is possible to operate the MIG-arc over a very wide current range from low values up to several hundred amperes. The plasma arc current is however limited, by the overheating of the non-consumable electrode, to the order of 100A in the case of steel electrodes. For conditions wherein the MIG-arc takes less than about 250A, a deep penetration type weld is produced which has similar characteristics to a normal MIG-weld apart from the greater available heat input. However, for currents in excess of 250A the MIG arc gives a wide shallow deposit. This is due to the consumable electrode developing a helical spiral, so that the MIG-arc rotates in a circle of approximately the weld pool in size. This action depends in part on resistive heating of the consumable electrode to render it sufficiently soft.

With the electrodes negative, the non-consumable electrode is capable of carrying considerably higher current than with positive polarity without overheating, negative polarity being the normally-used polarity for plasma welding. Higher MIG-arc currents can be used without the wide shallow deposition effect. However, on negative polarity the MIG-arc is less stable in operation. Not only are the ranges of operating voltages and currents more restricted, but also care is needed in the balance between the plasma gas and the external shielding gas stream as well as careful adjustment of the stand-off distance between the nozzle and the workpiece. The cause of the instability found on negative polarity is due to the behaviour of the arc on the consumable electrode. In the inert atmosphere of the plasma gas, for instance pure argon, the cathode root tends to wander along the negative consumable electrode. The arc root is apparently subjected to excursion on the electrode and may cause disturbance to the plasma-MIG system. This may lead to either the arc climbing the consumable electrode and fusing the contact tube on the one hand, or at times the consumable electrode feeds down, touches the workpiece and causes the plasma arc to transfer to the consumable electrode and, hence extinguish the plasma arc.

SUMMARY OF THE INVENTION

It is the object of the present invention to improve the stability of the MIG-arc on negative polarity and to extend the system to higher current levels on both negative and positive polarities.

According to one aspect of the invention there is provided a method of plasma-MIG arc welding, wherein a plasma arc is maintained, in a flow of inert gas, between the end of a non-consumable electrode and a workpiece, wherein a consumable electrode is coaxially guided into the plasma stream, wherein a MIG arc is maintained between the end of the consumable electrode and the workpiece, and wherein an oxidizing gas stream is introduced into the plasma stream in a region intermediate the respective ends of the consumable and non-consumable electrodes.

By introducing an oxidizing gas into the plasma stream, at least the end portion of the consumable electrode is exidized by the oxidizing gas atmosphere with the result that excursion of a cathode root on the negative consumable electrode is eliminated, the cathode root maintaining a defined location thereon. Furthermore the prevention of cathode root excursion allows a considerable reduction in the set-back distance of the end of the contact tube, through which the consumable electrode is fed, from the end of the consumable electrode. This has considerable practical advantage, in that it is less difficult to maintain a concentric electrode feed over the shorter set-back distance, and a more concentrated MIG-arc is produced without the rotation effect found on positive polarity. Thus the whole plasma system can be brought closer to the surface of the workpiece, which increases the efficiency of operation from the greater concentration of heat flux and which results in a high deposition rate of the consumable electrode and in the ability to carry higher current on the negative non-consumable electrode. The oxidising gas injection results in a much more tolerant MIG-arc such that a wider range of operating currents and voltages can be readily used; the system being at least as stable as on positive polarity.

Although stabilization of the MIG-arc with the electrodes on positive polarity is not generally required, injection of an oxidizing gas stream acts as an insurance against damage to the nozzle or to the contact tube due to the MIG-arc burning back. It is possible to reduce the distance between the contact tube tip and the non-consumable electrode and also the standoff distance between the nozzle and the workpiece. This gives a system with a higher concentration of heat flux on the work. Furthermore the tendency to develop a rotating arc is diminished, partly from the reduced geometry and partly from the reduced resistive heating of the consumable electrode. The combined effect of these two features reduces the tendency to rotation, and allows a higher working current for any given degree of rotation. The MIG-arc can thus be extended to higher current levels on positive polarity then would normally occur to give a deeply penetrating arc system.

It is to be noted that in gas-shielded MIG-arc welding it is known per se to stabilize the arc root by using an oxidizing gas mixture as shielding gas. However using an oxidizing gas mixture as plasma gas in plasma-MIG arc welding is not acceptable; in order to prevent oxidation of the non-consumable electrode the plasma arc has to operate in an inert atmosphere; the degree of oxidizing gas required to give reasonable benefits to the MIG-arc has severe effects on the life of the non-consumable electrode. In the method according to the invention oxidation of the non-consumable electrode is prevented by introducing the oxidizing gas stream in a region downstream of the end of the non-consumable electrode so that the oxidizing atmosphere affects the consumable electrode and not the non-consumable electrode.

In a preferred embodiment of the method according to the invention the oxidizing gas stream consists of a mixture of an inert gas and oxygen containing up to 10% by volume oxygen. The addition of about 10% oxygen not only stabilizes the MIG-arc but furthermore results in a much more regular weld bead. An amount of oxygen beyond 10% does not lead to any improvement.

Preferably the oxidizing gas stream consists of a mixture of an inert gas and oxygen containing one to three percent by volume oxygen. A mixture of argon with about 2% oxygen gave the best general operation conditions.

In a preferred embodiment of the method according to the invention, the plasma stream is constricted by the orifice of a nozzle located intermediate the respective ends of the consumable and non-consumable electrodes and wherein the oxidising gas stream is injected into the plasma stream in the region of the nozzle orifice. Preferably, the gas stream is injected into the plasma gas stream in a direction transverse to the flow direction of the plasma stream.

The injection of the oxidizing gas into the nozzle orifice stiffens the plasma stream and causes an increased constriction of the plasma stream with an associated increase in plasma voltage; by injecting the oxidizing gas in a transverse direction of the plasma stream, this gas can reach the consumable electrode in an optical manner.

According to a further aspect of the invention, there is provided a welding torch for plasma-MIG arc welding including a chamber, means for passing a stream of inert gas through the chamber, a nozzle with an orifice at the downstream end of the chamber, a non-consumable electrode having an end located within the chamber, means for guiding a consumable electrode through the nozzle orifice in the direction of flow of the inert gas stream so that its end projects beyond the nozzle orifice, and at least one channel for feeding an oxidizing gas into the stream of inert gas in a region intermediate the respective ends of the consumable and non-consumable electrodes.

The manner of injection of the oxidizing gas is not critical, as long as the gas is introduced downstream of the non-consumable electrode. The use of more than one injection channel is possible, but it has been found that a single injection channel is sufficient. The gas velocity with a single channel at a given injection volume rate can be made sufficiently high to penetrate the plasma stream and to give the necessary stabilization to the MIG-arc.

In a preferred embodiment of a welding torch according to the further aspect of the invention, the channel for feeding the oxidizing gas opens into the nozzle orifice, preferably radially thereof. By this arrangement the oxidising gas stream can be injected in the most effective manner, into the nozzle orifice and in a radial direction to easily penetrate the constricted plasma gas stream.

According to yet a further aspect of the invention, welding apparatus is provided which includes a welding torch as referred to above and further including power supply means for maintaining a plasma arc between the end of the non-consumable electrode and a workpiece and for maintaining a MIG-arc between the end of the consumable electrode and the workpiece.

Embodiments of the invention will now be described in greater detail by way of example, with reference to the accompanying drawings.

DESCRIPTION OF THE PREFERRED EMBODIMENTS

Figure 1:
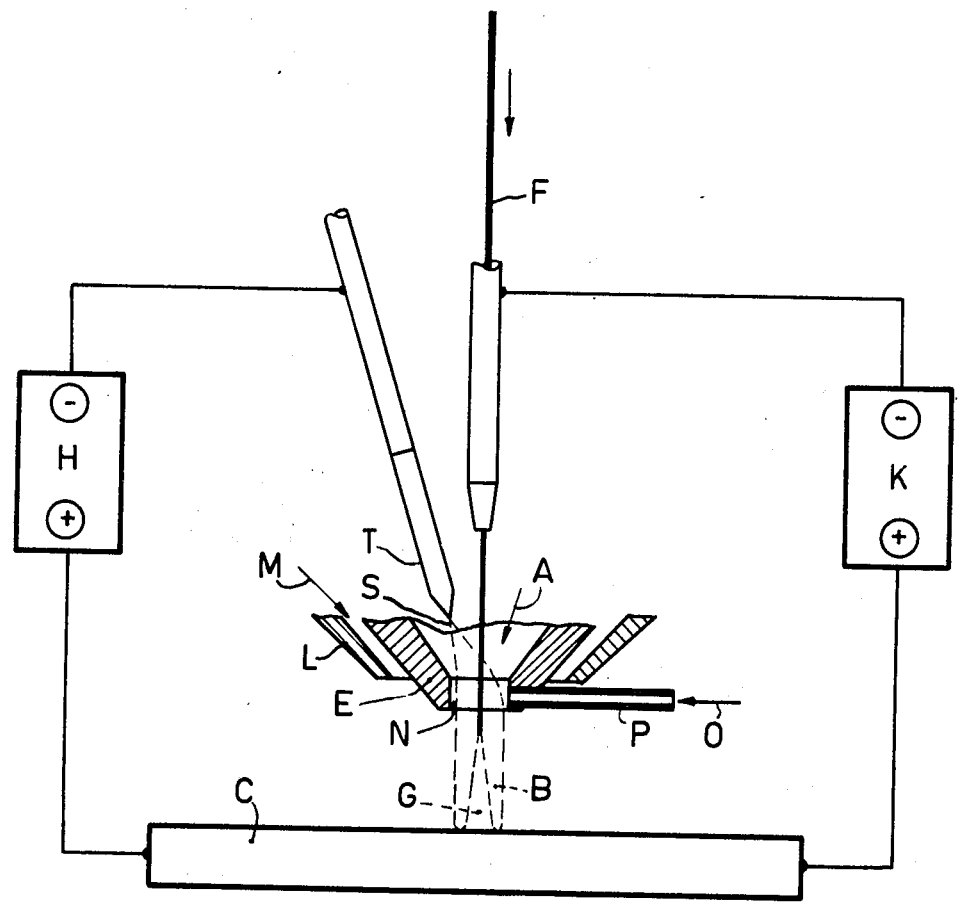
FIG. 1 shows diagrammatically a welding torch for plasma-MIG-welding according to the invention.

The method according to the invention will now be described with reference to FIG. 1. A plasma arc S is maintained between a workpiece C and a non-consumable electrode T, for example of tungsten, in a gas flow A for example argon. A plasma stream B produced by the plasma arc is constricted by the orifice N of a nozzle E. A consumable electrode F is fed axially into the plasma stream B, an arc G being maintained between the consumable electrode F and the workpiece C. The non-consumable electrode T is connected to the negative terminal of a current supply source H, the consumable electrode F being connected to the negative terminal of a second current supply source K; the positive terminals of both the supply sources H and K are connected to the workpiece C. A shielding gas M, for example a mixture of argon and carbon dioxide, is supplied through a nozzle L. A supplementary oxidizing gas stream O, for example a mixture of argon and oxygen, is injected into the nozzle orifice N and into the constricted plasma stream by means of an injection channel P terminating in the nozzle orifice.

Figure 2:
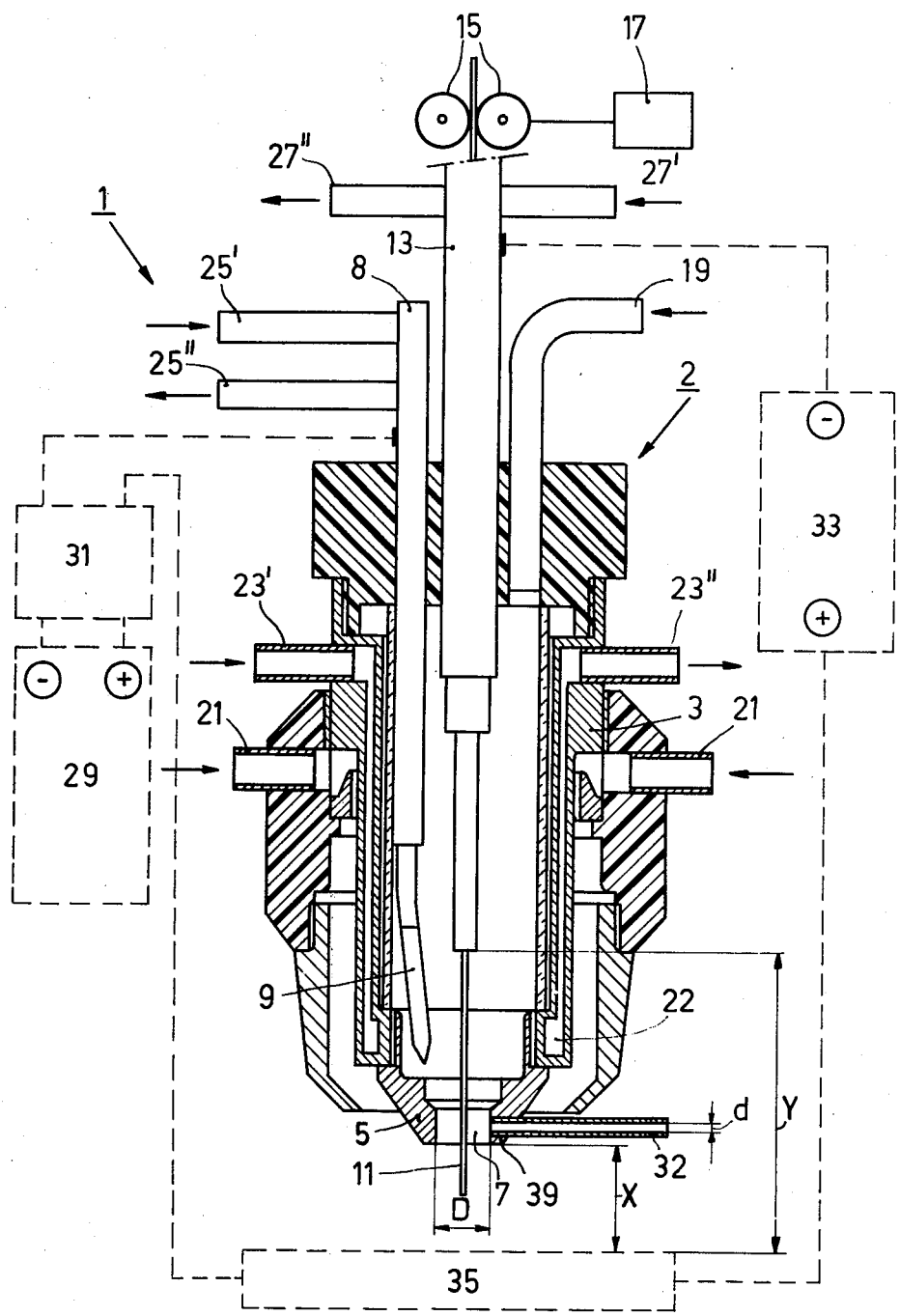
FIG. 2 shows welding apparatus including a welding torch according to the invention.

FIG. 2 shows a practical embodiment of a welding apparatus with a welding torch for performing plasma-MIG-welding according to the method of the invention. The apparatus 1 comprises a welding torch 2 having a housing 3 which is provided with a nozzle 5 having an orifice 7. An electrode holder 8 with a nonconsumable electrode 9, for example of tungsten, is placed eccentrically, relative to the nozzle orifice 7, in the housing 3. A consumable electrode 11 is fed axially into the centre of the nozzle orifice 7 by means of a guide tube 13. The electrode 11 is driven by rollers 15 rotated by a motor 17 at a controllable speed. The welding torch 2 furthermore comprises a supply duct 19 for the supply of a plasma gas, for example argon, and connections 21 for the supply of a shielding gas, for example a mixture of argon and carbon dioxide. The housing 3, the electrode holder 8 and the guide tube 13 are provided with cooling chambers, only the cooling chamber 22 of the housing being shown in the drawing. These cooling chambers communicate with connections 23', 23'', 25', 25'', 27', 27'', for the supply and discharge of cooling water. The tungsten electrode 9 is connected via the electrode holder 8 to the negative terminal of a current supply source 29 via high frequency generator 31. The consumable electrode 11 is connected via the guide tube 13 to the negative terminal of a second current supply source 33. A workpiece 35 is connected to the positive terminals of the two supply sources 29 and 33. A tube 32 for the injection of a supplementary oxidizing gas stream, for example a mixture of argon and oxygen, terminates in a radial bore 39 in the nozzle 5, which bore opens into the nozzle orifice 7. X denotes the stand-off distance between the nozzle 5 and the workpiece 35, Y denotes the set-back distance of the tip of the guide tube 13; D is the diameter of the nozzle orifice 7, and $d$ is the inner diameter of the injection tube 37.

In practice it has been found that optimal results are obtained with the following gas compositions and gas feed rates:

plasma gas: argon at about 3.5 liters/min.
shielding gas: mixture of argon and $CO_2$ containing 20% by volume of $CO_2$, at about 22 liters/min.
injection gas: mixture of argon and $O_2$ containing 2% by volume of $O_2$.

Use was made of an apparatus shown in FIG. 2, the nozzle orifice having a diameter of 8 to 10 mm and the injection tube having an inner diameter of 1.5 mm.

The invention has been described with reference to an embodiment in which the electrodes had negative polarity. For performing the method with positive polarity of the electrodes, the same apparatus may be used as for negative polarity with the exception that the electrodes are connected to the positive terminal of the current supply sources, the workpiece being connected to the negative terminals thereof.

What is claimed is:

1. In a method of plasma-MIG arc welding including connecting a first current source across a non-consumable electrode and the workpiece and thereby maintaining a plasma arc in a flow of inert gas between the end of said non-consumable electrode and said workpiece, guiding a consumable electrode coaxially into the plasma stream, connecting a second current source across a consumable electrode and the workpiece and thereby maintaining a MIG arc between the end of the consumable electrode and the workpiece, the improvement in combination therewith comprising introducing an oxidizing gas stream into the plasma stream in a region intermediate the respective ends of the consumable and non-consumable electrodes.

2. A method according to claim 1 wherein the oxidizing gas stream comprises a mixture of up to 10 percent by volume of oxygen in an inert gas.

3. A method according to claim 2 wherein the oxidizing gas stream contains 1 to 3 percent by volume of oxygen.

4. A method according to claim 1, further comprising the steps of constricting the plasma stream by the orifice of a nozzle located intermediate the respective ends of the consumable and non-consumable electrodes and injecting said oxidizing gas stream into the plasma stream in the region of the nozzle orifice.

5. A method according to claim 4 further comprising injecting said oxidizing gas stream into the plasma gas stream in a direction transverse to the flow direction of the plasma stream.

6. A method according to claim 5 further comprising injecting said oxidizing gas stream into the plasma gas stream in a direction radial to the nozzle orifice.

7. In a welding torch for plasma-MIG arc welding operable with a workpiece, a source of inert gas, and a source of oxidizing gas, including a housing defining therein a chamber with a downstream end, a nozzle with an orifice in the housing at the downstream end of the chamber, a non-consumable electrode having an end located within the chamber, channel means for passing a stream of said inert gas downstream through said chamber, means for guiding a consumable electrode through the chamber and nozzle orifice in the direction of flow of the inert gas stream so that the end of this electrode projects beyond and external of the nozzle orifice, power supply means for maintaining a plasma arc between the end of the non-consumable electrode and a workpiece and for maintaining a MIG arc between the end of the consumable electrode and said workpiece, the improvement in combination therewith comprising means for feeding said oxidizing gas into the stream of inert gas in a region intermediate the respective ends of the consumable and non-consumable electrodes.

8. A welding torch according to claim 7 wherein the said channel means opens into the nozzle orifice.

9. A welding torch according to claim 8 wherein the said channel means opens into the orifice radially thereof.

* * * * *